United States Patent
Li

(10) Patent No.: US 11,449,386 B2
(45) Date of Patent: Sep. 20, 2022

(54) METHOD AND SYSTEM FOR OPTIMIZING PERSISTENT MEMORY ON DATA RETENTION, ENDURANCE, AND PERFORMANCE FOR HOST MEMORY

(71) Applicant: Alibaba Group Holding Limited, Grand Cayman (KY)

(72) Inventor: Shu Li, Bothell, WA (US)

(73) Assignee: Alibaba Group Holding Limited, George Town (KY)

(*) Notice: Subject to any disclaimer, the term of this patent is extended or adjusted under 35 U.S.C. 154(b) by 123 days.

(21) Appl. No.: 16/825,414

(22) Filed: Mar. 20, 2020

(65) Prior Publication Data

US 2021/0294695 A1    Sep. 23, 2021

(51) Int. Cl.
```
G06F 11/10      (2006.01)
G06F 11/16      (2006.01)
G06F 12/02      (2006.01)
G06F 11/30      (2006.01)
G06F 12/0882    (2016.01)
G06F 11/07      (2006.01)
```

(52) U.S. Cl.
CPC ........ *G06F 11/1068* (2013.01); *G06F 11/076* (2013.01); *G06F 11/1044* (2013.01); *G06F 11/1658* (2013.01); *G06F 11/3037* (2013.01); *G06F 12/0246* (2013.01); *G06F 12/0882* (2013.01)

(58) Field of Classification Search
CPC ............. G06F 11/1068; G06F 12/0246; G06F 11/076; G06F 11/3037; G06F 11/1044; G06F 12/0882; G06F 11/1658
USPC ...................................................... 714/763
See application file for complete search history.

(56) References Cited

U.S. PATENT DOCUMENTS

| | | |
|---|---|---|
| 5,715,471 A | 2/1998 | Otsuka |
| 7,351,072 B2 | 4/2008 | Muff |
| 8,527,544 B1 | 9/2013 | Colgrove |
| 8,819,367 B1 | 8/2014 | Fallone |
| 8,832,688 B2 | 9/2014 | Tang |

(Continued)

OTHER PUBLICATIONS

C. Wu, D. Wu, H. Chou and C. Cheng, "Rethink the Design of Flash Translation Layers in a Component-Based View", in IEEE Acess, vol. 5, pp. 12895-12912, 2017.
Po-Liang Wu, Yuan-Hao Chang and T. Kuo, "A file-system-aware FTL design for flash-memory storage systems," 2009, pp. 393-398.
S. Choudhuri and T. Givargis, "Preformance improvement of block based NAND flash translation layer", 2007 5th IEEE/ACM/IFIP International Conference on Hardware/Software Codesign and Systems Synthesis (CODES+ISSS). Saizburg, 2007, pp. 257-262.

(Continued)

*Primary Examiner* — James C Kerveros
(74) *Attorney, Agent, or Firm* — Shun Yao; Yao Legal Services, Inc.

(57) ABSTRACT

A system is provided to receive a first request to write data to a storage system, which comprises an MRAM, a NOR, a DRAM, and a NAND. The system writes the data to the MRAM. The system copies the data from the MRAM: to the NOR in response to determining that the data is read at a frequency greater than a first predetermined threshold and is updated at a frequency less than a second predetermined threshold; to the DRAM in response to determining that the data is read at a frequency less than the first predetermined threshold and is updated at a frequency greater than the second predetermined threshold; and to the NAND in response to determining that the data is read at a frequency less than the first predetermined threshold and is updated at a frequency less than the second predetermined threshold.

18 Claims, 11 Drawing Sheets

(56) References Cited

U.S. PATENT DOCUMENTS

| | | |
|---|---|---|
| 9,031,296 B2 | 5/2015 | Kaempfer |
| 9,213,627 B2 | 12/2015 | Van Acht |
| 9,495,263 B2 | 11/2016 | Pang |
| 9,529,670 B2 | 12/2016 | O'Connor |
| 9,569,454 B2 | 2/2017 | Ebsen |
| 9,575,982 B1 | 2/2017 | Sankara Subramanian |
| 9,607,631 B2 | 3/2017 | Rausch |
| 9,671,971 B2 | 6/2017 | Trika |
| 9,836,232 B1 | 12/2017 | Vasquez |
| 9,852,076 B1 | 12/2017 | Garg |
| 9,912,530 B2 | 3/2018 | Singatwaria |
| 9,923,562 B1 | 3/2018 | Vinson |
| 9,946,596 B2 | 4/2018 | Hashimoto |
| 10,268,390 B2 | 4/2019 | Warfield |
| 10,361,722 B2 | 7/2019 | Lee |
| 10,459,663 B2 | 10/2019 | Agombar |
| 10,642,522 B2 | 5/2020 | Li |
| 10,649,657 B2 | 5/2020 | Zaidman |
| 10,678,432 B1 | 6/2020 | Dreier |
| 10,756,816 B1 | 8/2020 | Dreier |
| 10,928,847 B2 | 2/2021 | Suresh |
| 10,990,526 B1 | 4/2021 | Lam |
| 2001/0046295 A1 | 11/2001 | Sako |
| 2002/0112085 A1 | 8/2002 | Berg |
| 2004/0267752 A1 | 12/2004 | Wong |
| 2005/0138325 A1 | 6/2005 | Hofstee |
| 2005/0144358 A1 | 6/2005 | Conley |
| 2006/0101197 A1 | 5/2006 | Georgis |
| 2006/0156009 A1 | 7/2006 | Shin |
| 2006/0184813 A1 | 8/2006 | Bui |
| 2007/0250756 A1 | 10/2007 | Gower |
| 2007/0266011 A1 | 11/2007 | Rohrs |
| 2007/0283104 A1 | 12/2007 | Wellwood |
| 2008/0028223 A1 | 1/2008 | Rhoads |
| 2008/0065805 A1 | 3/2008 | Wu |
| 2008/0082731 A1 | 4/2008 | Karamcheti |
| 2008/0163033 A1 | 7/2008 | Yim |
| 2008/0195829 A1 | 8/2008 | Wilsey |
| 2009/0006667 A1 | 1/2009 | Lin |
| 2009/0125788 A1 | 5/2009 | Wheeler |
| 2009/0183052 A1 | 7/2009 | Kanno |
| 2009/0254705 A1 | 10/2009 | Abali |
| 2009/0307426 A1 | 12/2009 | Galloway |
| 2010/0281254 A1 | 11/2010 | Carro |
| 2011/0031546 A1 | 2/2011 | Uenaka |
| 2011/0060722 A1 | 3/2011 | Li |
| 2011/0239083 A1 | 9/2011 | Kanno |
| 2011/0252188 A1 | 10/2011 | Weingarten |
| 2011/0289263 A1 | 11/2011 | McWilliams |
| 2011/0289280 A1 | 11/2011 | Koseki |
| 2011/0296411 A1 | 12/2011 | Tang |
| 2011/0302408 A1 | 12/2011 | McDermott |
| 2012/0017037 A1 | 1/2012 | Riddle |
| 2012/0151253 A1 | 6/2012 | Horn |
| 2012/0203958 A1 | 8/2012 | Jones |
| 2012/0324312 A1 | 12/2012 | Moyer |
| 2012/0331207 A1 | 12/2012 | Lassa |
| 2013/0016970 A1 | 1/2013 | Koka |
| 2013/0018852 A1 | 1/2013 | Barton |
| 2013/0024605 A1 | 1/2013 | Sharon |
| 2013/0138871 A1* | 5/2013 | Chiu ................ G06F 11/2094 |
| | | 711/103 |
| 2013/0179898 A1 | 7/2013 | Fang |
| 2013/0205183 A1 | 8/2013 | Fillingim |
| 2013/0227347 A1 | 8/2013 | Cho |
| 2013/0254622 A1 | 9/2013 | Kanno |
| 2013/0329492 A1 | 12/2013 | Yang |
| 2014/0082412 A1 | 3/2014 | Matsumura |
| 2014/0095769 A1 | 4/2014 | Borkenhagen |
| 2014/0108891 A1 | 4/2014 | Strasser |
| 2014/0164447 A1 | 6/2014 | Tarafdar |
| 2014/0164879 A1 | 6/2014 | Tam |
| 2014/0215129 A1 | 7/2014 | Kuzmin |
| 2014/0223079 A1 | 8/2014 | Zhang |
| 2014/0379965 A1 | 12/2014 | Gole |
| 2015/0006792 A1* | 1/2015 | Lee ...................... G06F 3/0604 |
| | | 711/103 |
| 2015/0039849 A1 | 2/2015 | Lewis |
| 2015/0143030 A1 | 5/2015 | Gorobets |
| 2015/0186657 A1 | 7/2015 | Nakhjiri |
| 2015/0199234 A1 | 7/2015 | Choi |
| 2015/0286477 A1 | 10/2015 | Mathur |
| 2015/0310916 A1 | 10/2015 | Leem |
| 2015/0317095 A1 | 11/2015 | Voigt |
| 2015/0341123 A1 | 11/2015 | Nagarajan |
| 2015/0363328 A1 | 12/2015 | Candelaria |
| 2016/0048327 A1 | 2/2016 | Jayasena |
| 2016/0054922 A1 | 2/2016 | Awasthi |
| 2016/0062885 A1 | 3/2016 | Ryu |
| 2016/0077749 A1 | 3/2016 | Ravimohan |
| 2016/0077764 A1 | 3/2016 | Ori |
| 2016/0103631 A1 | 4/2016 | Ke |
| 2016/0124742 A1 | 5/2016 | Rangasamy |
| 2016/0132237 A1 | 5/2016 | Jeong |
| 2016/0141047 A1* | 5/2016 | Sehgal ................ G11C 11/5642 |
| | | 365/185.02 |
| 2016/0155750 A1 | 6/2016 | Yasuda |
| 2016/0224267 A1 | 8/2016 | Yang |
| 2016/0234297 A1 | 8/2016 | Ambach |
| 2016/0306699 A1 | 10/2016 | Resch |
| 2016/0321002 A1 | 11/2016 | Jung |
| 2016/0335085 A1 | 11/2016 | Scalabrino |
| 2016/0381442 A1 | 12/2016 | Heanue |
| 2017/0004037 A1 | 1/2017 | Park |
| 2017/0123655 A1 | 5/2017 | Sinclair |
| 2017/0185498 A1 | 6/2017 | Gao |
| 2017/0192848 A1 | 7/2017 | Pamies-Juarez |
| 2017/0199823 A1 | 7/2017 | Hayes |
| 2017/0242722 A1 | 8/2017 | Qiu |
| 2017/0269998 A1 | 9/2017 | Sunwoo |
| 2017/0279460 A1 | 9/2017 | Camp |
| 2017/0322888 A1 | 11/2017 | Booth |
| 2018/0067847 A1 | 3/2018 | Oh |
| 2018/0069658 A1 | 3/2018 | Benisty |
| 2018/0074730 A1 | 3/2018 | Inoue |
| 2018/0076828 A1 | 3/2018 | Kanno |
| 2018/0113631 A1 | 4/2018 | Zhang |
| 2018/0165038 A1 | 6/2018 | Authement |
| 2018/0165169 A1 | 6/2018 | Camp |
| 2018/0165340 A1 | 6/2018 | Agarwal |
| 2018/0173620 A1 | 6/2018 | Cen |
| 2018/0188970 A1 | 7/2018 | Liu |
| 2018/0189175 A1 | 7/2018 | Ji |
| 2018/0219561 A1 | 8/2018 | Litsyn |
| 2018/0226124 A1 | 8/2018 | Perner |
| 2018/0260148 A1 | 9/2018 | Klein |
| 2018/0321864 A1 | 11/2018 | Benisty |
| 2018/0322024 A1 | 11/2018 | Nagao |
| 2018/0357126 A1 | 12/2018 | Dhuse |
| 2018/0373664 A1 | 12/2018 | Vijayrao |
| 2019/0050327 A1 | 2/2019 | Li |
| 2019/0065085 A1 | 2/2019 | Jean |
| 2019/0073261 A1 | 3/2019 | Halbert |
| 2019/0087089 A1 | 3/2019 | Yoshida |
| 2019/0087115 A1 | 3/2019 | Li |
| 2019/0087328 A1 | 3/2019 | Kanno |
| 2019/0116127 A1 | 4/2019 | Pismenny |
| 2019/0172820 A1 | 6/2019 | Meyers |
| 2019/0196748 A1 | 6/2019 | Badam |
| 2019/0196907 A1 | 6/2019 | Khan |
| 2019/0212949 A1 | 7/2019 | Pletka |
| 2019/0220392 A1 | 7/2019 | Lin |
| 2019/0272242 A1 | 9/2019 | Kachare |
| 2019/0278654 A1 | 9/2019 | Kaynak |
| 2019/0317901 A1 | 10/2019 | Kachare |
| 2020/0013458 A1 | 1/2020 | Schreck |
| 2020/0042223 A1 | 2/2020 | Li |
| 2020/0042387 A1 | 2/2020 | Shani |
| 2020/0089430 A1 | 3/2020 | Kanno |
| 2020/0143885 A1 | 5/2020 | Kim |
| 2020/0159425 A1 | 5/2020 | Flynn |
| 2020/0167091 A1 | 5/2020 | Haridas |
| 2020/0210309 A1* | 7/2020 | Jung ...................... G06F 11/3034 |
| 2020/0218449 A1 | 7/2020 | Leitao |

(56) References Cited

U.S. PATENT DOCUMENTS

| | | |
|---|---|---|
| 2020/0225875 A1 | 7/2020 | Oh |
| 2020/0242021 A1 | 7/2020 | Gholamipour |
| 2020/0250032 A1 | 8/2020 | Goyal |
| 2020/0257598 A1 | 8/2020 | Yazovitsky |
| 2020/0326855 A1 | 10/2020 | Wu |
| 2020/0328192 A1 | 10/2020 | Zaman |
| 2020/0348888 A1 | 11/2020 | Kim |
| 2020/0387327 A1 | 12/2020 | Hsieh |
| 2020/0401334 A1 | 12/2020 | Saxena |
| 2020/0409791 A1 | 12/2020 | Devriendt |
| 2021/0010338 A1 | 1/2021 | Santos |
| 2021/0089392 A1 | 3/2021 | Shirakawa |
| 2021/0103388 A1 | 4/2021 | Choi |
| 2021/0191635 A1* | 6/2021 | Hu .................. G06F 3/0679 |
| 2021/0286555 A1 | 9/2021 | Li |

OTHER PUBLICATIONS

A. Zuck, O. Kishon and S. Toledo. "LSDM: Improving the Preformance of Mobile Storage with a Log-Structured Address Remapping Device Driver", 2014 Eighth International Conference on Next Generation Mobile Apps, Services and Technologies, Oxford, 2014, pp. 221-228.

J. Jung and Y. Won, "nvramdisk: A Transactional Block Device Driver for Non-Volatile RAM", in IEEE Transactions on Computers, vol. 65, No. 2, pp. 589-600, Feb. 1, 2016.

Te I et al. (Pensieve: a Machine Assisted SSD Layer for Extending the Lifetime: (Year: 2018).

ARM ("Cortex-R5 and Cortex-R5F", Technical reference Manual, Revision r1p1) (Year:2011).

* cited by examiner

METHOD AND SYSTEM FOR OPTIMIZING PERSISTENT MEMORY ON DATA RETENTION, ENDURANCE, AND PERFORMANCE FOR HOST MEMORY

BACKGROUND

Field

This disclosure is generally related to the field of data storage.

More specifically, this disclosure is related to a method and system for optimizing persistent memory on data retention, endurance, and performance for host memory.

Related Art

Today, various storage systems are being used to store and access the ever-increasing amount of digital content. A storage system can include storage servers with one or more storage devices or drives, and a storage device or drive can include storage media with persistent memory, i.e., a non-volatile memory. A storage system generally uses the volatile memory of dynamic random access memory (DRAM) as system memory. Current applications may require high-performance processing which can involve moving large amounts of data between processors, memory, and storage drives. This high-performance processing can limit, e.g., performance, cost, power consumption, bandwidth, data retention, and endurance. Furthermore, data storage generally requires persistence with low latency.

While non-volatile memory continues to develop with improvements in yield, performance, endurance, and data retention as a potential alternative to DRAM for usage as system memory, the challenge remains for the non-volatile memory to meet the requirements of endurance and noise immunity. Phase change memory (PCM) is one type of non-volatile memory which can be manufactured in the dual in-line memory module (DIMM) format. In a current storage system, an additional tier (such as 3D XPoint (3DXP)) can be inserted between the DRAM DIMM and the storage drive as a supplementary DRAM system memory. However, this additional tier neither replaces DRAM as the main system memory nor provides the performance (bandwidth), endurance, and data retention sufficient to meet the requirements of host memory.

Thus, challenges remain as current non-volatile memory continues to face the trilemma of balancing data retention, endurance, and bandwidth.

SUMMARY

One embodiment provides a system which facilitates operation of a storage system. During operation, the system receives a first request to write data to a storage system, which comprises a first non-volatile memory, a second non-volatile memory, a dynamic random access memory (DRAM), and a third non-volatile memory. The system writes the data to the first non-volatile memory. The system copies the data from the first non-volatile memory to the second non-volatile memory in response to determining that the data is read at a frequency greater than a first predetermined threshold and is updated at a frequency less than a second predetermined threshold. The system copies the data from the first non-volatile memory to the DRAM in response to determining that the data is read at a frequency less than the first predetermined threshold and is updated at a frequency greater than the second predetermined threshold. The system copies the data from the first non-volatile memory to the third non-volatile memory in response to determining that the data is read at a frequency less than the first predetermined threshold and is updated at a frequency less than the second predetermined threshold.

In some embodiments, the system leaves the data in the first non-volatile memory in response to determining that the data is read at a frequency greater than the first predetermined threshold and is updated at a frequency greater than the second predetermined threshold.

In some embodiments, the system monitors a frequency of access of the data, which comprises: determining whether the data is read at a frequency greater than or less than the first predetermined threshold; and determining whether the data is updated at a frequency greater than or less than the second predetermined threshold.

In some embodiments, the system tracks, in a first table, a first number of times that the data is read. The system tracks, in the first table, a second number of times that the data is updated.

In some embodiments, a first reserved pool of pages in the first non-volatile memory is associated with usage by user data, a second reserved pool of pages in the first non-volatile memory is associated with usage by parity data, and the second reserved pool is bigger than the first reserved pool. Furthermore, a first ratio of a nominal capacity for user data to a nominal capacity for parity data is greater than a second ratio of a size of the first reserved pool to a size of the second reserved pool.

In some embodiments, the first non-volatile memory comprises a magnetoresistive random-access memory (MRAM), the second non-volatile memory comprises a Not-OR (NOR) memory, and the third non-volatile memory comprises a Not-AND (NAND) memory. The described embodiments and figures depict and refer to MRAM as the "first non-volatile memory" for illustrative purposes only. Other types of the "first non-volatile memory" may be used, e.g., resistive random-access memory (ReRAM) and other media associated with an access latency for read and write operations similar to the access latency of MRAM. Furthermore, the described embodiments and figures depict and refer to NOR flash as the "second non-volatile memory" for illustrative purposes only. Other types of the "second non-volatile memory" may be used, including storage media associated with an access latency for read and write operations similar to the access latency of NOR flash. In addition, the described embodiments and figures depict and refer to NAND flash as the "third non-volatile memory" for illustrative purposes only. Other types of the "third non-volatile memory" may be used, e.g., phase change memory (PCM) and other storage media associated with an access latency for read and write operations similar to the access latency of NAND flash. The term "similar" is used herein to mean within a certain predetermined range or threshold.

In some embodiments, the system writes a plurality of user data chunks to the first non-volatile memory, wherein a respective user data chunk is associated with a first user portion and a second parity portion generated based on a first error correction code (ECC) encoding of the first user portion. Writing the plurality of user data chunks to the first non-volatile memory involves: concatenating the plurality of user data chunks; generating a first parity for the concatenated plurality of user data chunks based on a second error correction code (ECC); and writing the concatenated user data chunks and the generated first parity to the first non-volatile memory, wherein the generated first parity is written to a first physical location of the first non-volatile memory. The system monitors a frequency of access of the written user data chunks, which comprises tracking, for each respective user data chunk, a third number of times that the respective user data chunk is updated.

In some embodiments, the system writes an update of the respective user data chunk to the first non-volatile memory. The system replaces an existing user data chunk with the updated user data chunk. The system generates a new parity for the concatenated plurality of user data chunks, including the updated user data chunk, based on the second error correction code (ECC). In response to determining that the third number for the respective user data chunk is less than a third predetermined number, the system stores the new parity in the same first physical location.

In some embodiments, in response to determining that the third number for the respective user data chunk is greater than the third predetermined number: the system stores the new parity in a second physical location of the first non-volatile memory; and the system marks the first physical location as available or part of a reserved pool of pages for subsequent use.

BRIEF DESCRIPTION OF THE FIGURES

In the figures, like reference numerals refer to the same figure elements.

DETAILED DESCRIPTION

Figure 1:
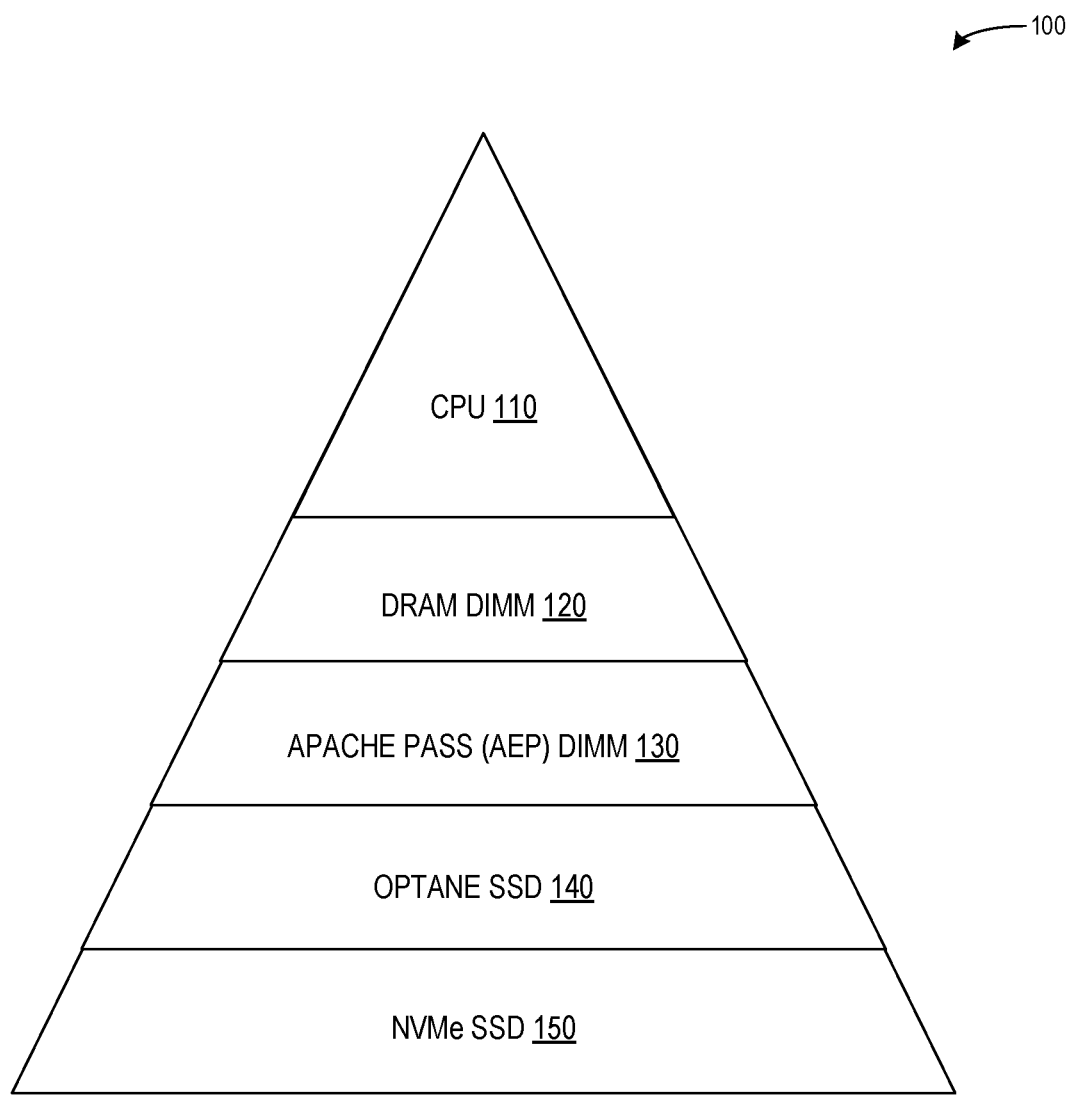
FIG. 1 illustrates an exemplary storage hierarchy, in accordance with the prior art.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein facilitate a storage system which uses MRAM, NOR, DRAM, and NAND ("persistent memory") to replace the volatile DRAM generally used as system memory. The system can be designed based on hardware and software which empowers the persistent memory as the main system memory and further breaks the traditional memory trilemma of data performance, endurance, and data retention. The various storage media can collaborate to form an online page migration based on a frequency of access of data.

As described above, a storage system generally uses the volatile memory of dynamic random access memory (DRAM) as system memory. Current applications may require high-performance processing which can involve moving large amounts of data between processors, memory, and storage drives. This high-performance processing can limit, e.g., performance, cost, power consumption, bandwidth, data retention, and endurance. Furthermore, data storage generally requires persistence with low latency.

While non-volatile memory continues to develop with improvements in yield, performance, endurance, and data retention as a potential alternative to DRAM for usage as system memory, the challenge remains for the non-volatile memory to meet the requirements of endurance and noise immunity. Phase change memory (PCM) is one type of non-volatile memory which can be manufactured in the dual in-line memory module (DIMM) format. In a current storage system, additional tiers (such as 3D XPoint (3DXP) or Apache Pass (AEP) DIMM and a phase change memory (PCM)-based storage device) can be inserted between the DRAM DIMM and the storage drive as a supplementary DRAM system memory, as described below in relation to FIG. 1. However, these additional tiers neither replace DRAM as the main system memory nor provide the performance (bandwidth), endurance, and data retention sufficient to meet the requirements of host memory. Thus, challenges remain as current non-volatile memory continues to face the trilemma of balancing data retention, endurance, and bandwidth.

The embodiments described herein address these issues by providing a storage system, which includes four different storage media: MRAM, a NOR memory, DRAM, and a NAND memory. The storage system can store data in these four different storage media (which can serve as the main system memory) based on an access frequency of the data, and can thus provide a replacement for the main system memory, as described below in relation to FIG. 2. The system can group the content in the main memory into four categories based on a frequency of access or an access pattern. The system can monitor (e.g., on a periodic basis) access statistics for each page. For example, the system can monitor a frequency that a certain page of data is read and/or updated. The first group or category can include pages with high-intensity read and high-intensity write (rule: keep in MRAM). The second group can include pages with high-intensity read and low-intensity write (rule: copy from MRAM to NOR). The third group can include pages with low-intensity read and high-intensity write (rule: copy from MRAM to DRAM). The fourth group can include pages with low-intensity read and low-intensity write (rule: copy from MRAM to NAND). An exemplary movement of pages based on access frequency is described below in relation to FIGS. 3 and 4.

Furthermore, the system can provide data reliability for the MRAM by using a strong error correction code concatenated with a plurality of user chunks which include an original error correction code. Because each update to a user chunk of a concatenated group of users chunks results in the generation of a new parity for the concatenated group of user chunks, the system can also track a number of times that a particular user chunk is updated, and place a newly generated parity in a same or a different location based on the tracked number. An exemplary concatenation, ECC parity generation, and ECC placement based on tracking are described below in relation to FIGS. 5 and 6.

Thus, the embodiments of the described storage system can provide various storage media which work together to serve as a replacement for system memory, by moving data from MRAM to one of NOR, DRAM, and NAND based on a monitored access frequency of the data (e.g., a number of times that the data is read or updated). By categorizing and moving the data based on access frequency in the storage system, the described embodiments can result in an improved storage system which efficiently optimizes the growing usage of MRAM. This improved storage system can break the memory trilemma between performance, endurance, and data retention.

A "distributed storage system" or a "storage system" can include multiple storage servers. A "non-volatile storage system" can include non-volatile memory. A "storage server" or a "storage system" can refer to a computing device which can include multiple storage devices or storage drives. A "storage device" or a "storage drive" refers to a device or a drive with a non-volatile memory which can provide persistent storage of data, e.g., a solid state drive (SSD), a hard disk drive (HDD), an MRAM-based storage device, or a flash-based storage device. A storage system can also be a computer system.

"Persistent memory" refers to storage media which may be used for persistent storage of data, e.g., MRAM, NOR, NAND, HDD, SSD, etc. The term "persistent memory" as used in this disclosure can also include DRAM, as the persistent memory of MRAM, NOR, DRAM, and NAND provide a replacement for the conventional system memory of DRAM. Furthermore, the described embodiments and figures depict and refer to MRAM, NOR flash, and NAND flash as, respectively, the "first non-volatile memory," the "second non-volatile memory," and the "third non-volatile memory" for illustrative purposes only. Other types of each of these three storage media may be used, including storage media associated with an access latency for read and write operations similar to the respective access latency of MRAM, NOR flash, and NAND flash.

A "computing device" refers to any server, device, node, entity, drive, or any other entity which can provide any computing capabilities.

Exemplary Operation of a Storage System in the Prior Art

FIG. 1 illustrates an exemplary storage hierarchy 100, in accordance with the prior art. Hierarchy 100 can include: a central processing unit (CPU) 110; a DRAM DIMM 120; an Apache Pass (AEP) DIMM 130; a phase change memory (PCM)-based storage device, such as an Optane SSD 140; and a Non-Volatile Memory Express (NVMe) SSD 150. AEP DIMM 130 can correspond to previously described 3DXP DIMM. AEP DIMM 130 and Optane SSD 140 are additional tiers which are inserted into hierarchy 100 to provide a supplementary DRAM system memory. However, in hierarchy 100, it is clear that AEP DIMM 130 does not replace DRAM DIMM 120. Furthermore, AEP DIMM 130 cannot provide the performance (bandwidth), endurance, and data retention required by host memory. Despite the insertion of these additional tiers, storage hierarchy 100 cannot provide the performance (e.g., bandwidth), endurance, and data retention sufficient to meet the requirements of host main memory.

Storage hierarchy 100 may be limited by the following factors. First, because of the additional storage devices (e.g., AEP DIMM 130 and Optane SSD 140), the depicted system may experience an increase in the number of data copy operations. The increase in the number of data copy operations can in turn lead to an increase in both write amplification and power consumption. Second, these additional storage devices (e.g., AEP DIMM 130 and Optane SSD 140) are generally based on phase change memory (PCM). PCM generally has a higher or longer access latency than DRAM, and a lower throughput than DRAM DIMM. Thus, AEP DIMM generally cannot increase the overall efficiency of the conventional storage system, and instead may serve only as a complementary component.

Third, the endurance of AEP DIMM is lower than that of DRAM DIMM. That is, AEP DIMM cannot reach the same endurance or wear level as DRAM DIMM, which can result in the storage media wearing out during usage and before an optimal or efficient time.

Fourth, AEP DIMM can currently only be used as either volatile memory or non-volatile storage, resulting in issues with either data persistency or the memory access format. That is, when AEP DIMM is used in the memory mode (e.g., as volatile memory), the data persistency may suffer, and when AEP DIMM is used in the storage mode (e.g., as non-volatile memory), certain functions like data loading and flushing are required, which does not allow the memory access format to be supported.

Thus, current storage hierarchy 100 (as described in FIG. 1) may be limited in providing the low latency, data persistency/retention, high endurance, and power efficiency required by the high-performance processing of current applications, and further cannot fully replace DRAM as the main system memory. In addition, the conventional storage systems are constrained in providing optimal usage and massive deployment of the fast-developing non-volatile memory of MRAM. All of these constraints can limit the flexibility and performance of the overall storage system.

Figure 2:
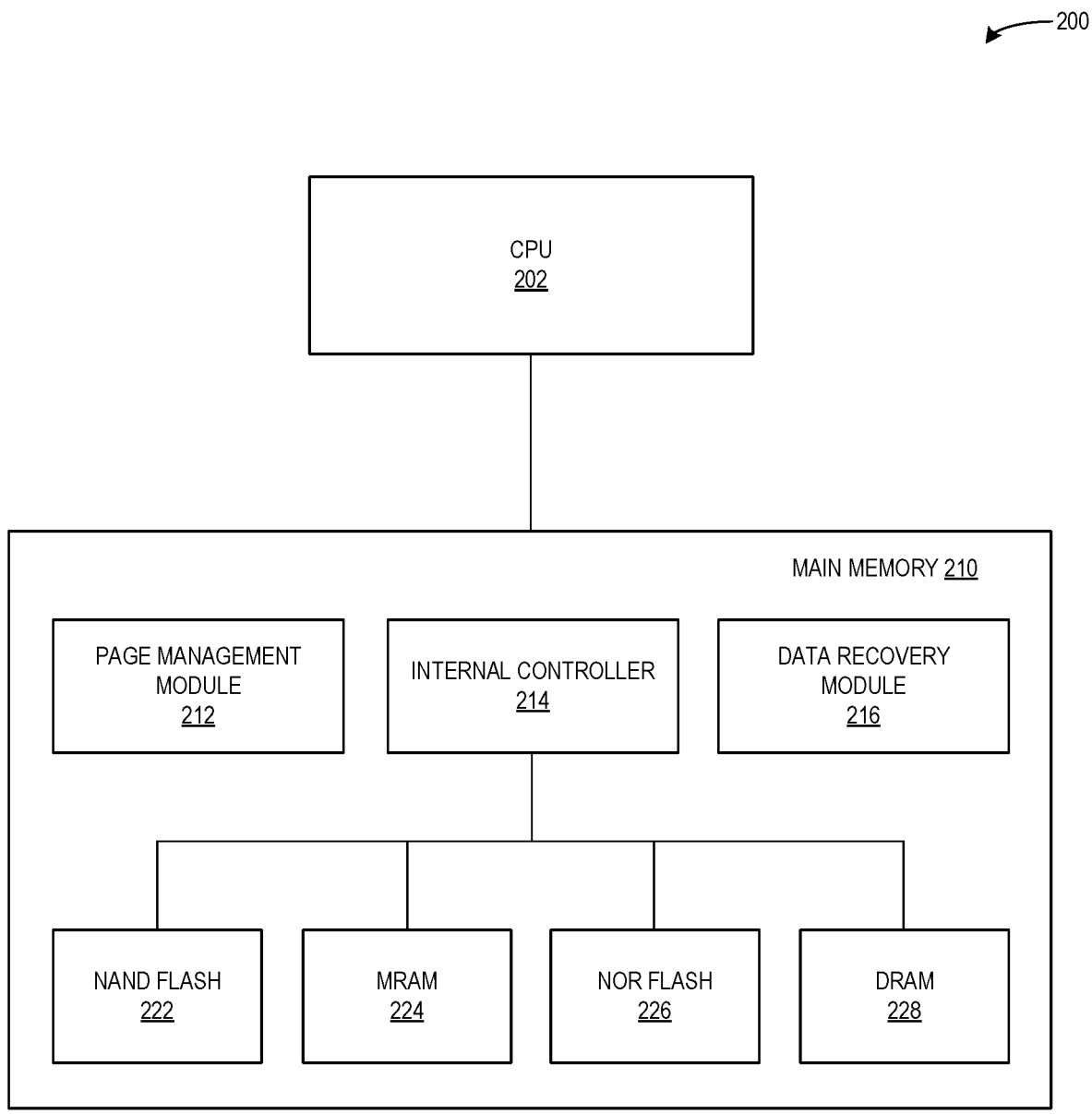
FIG. 2 illustrates a diagram of the internal structure of a memory which serves as a replacement for system memory, in accordance with an embodiment of the present application.

Exemplary Internal Structure of Persistent Memory to Replace System Memory and Exemplary Grouping of Pages into Multiple Storage Media Based on Access Frequency FIG. 2 illustrates a diagram 200 of the internal structure of a memory which serves as a replacement for system memory, in accordance with an embodiment of the present application. Diagram 200 depicts a CPU 202 which is coupled to a main memory 210. Main memory 210 can include: a page management module 212; an internal controller 214; and a data recovery module 216. Internal controller 214 can be coupled to or communicate with four different kinds of storage mediums: a NAND flash memory 222; an MRAM 224; a NOR flash memory 226; and a DRAM 228.

Page management module 212 can dynamically store memory pages based on data characteristics or access frequency. Internal controller 214 can manage the different storage mediums 222-228, as described below in relation to FIGS. 3 and 4. Data recovery module 216 can provide protection for data consistency in the event of data errors, faults, or other issues relating to the data.

Incoming data can initially be stored in MRAM 224. Page management module 212 can divide, categorize, and hold the data as memory pages based on access frequency, e.g., in one of four categories or groups. The category for a memory page can determine whether the corresponding data is kept in MRAM 224 or moved to one of the other storage mediums NAND 222, NOR 226, and DRAM 228.

The first group can include pages with high-intensity read and high-intensity write (keep in MRAM 224). The second group can include pages with high-intensity read and low-intensity write (copy from MRAM 224 to NOR 226). The third group can include pages with low-intensity read and high-intensity write (copy from MRAM 224 to DRAM 228). The fourth group can include pages with low-intensity read and low-intensity write (copy from MRAM 224 to NAND 222).

Figure 3:
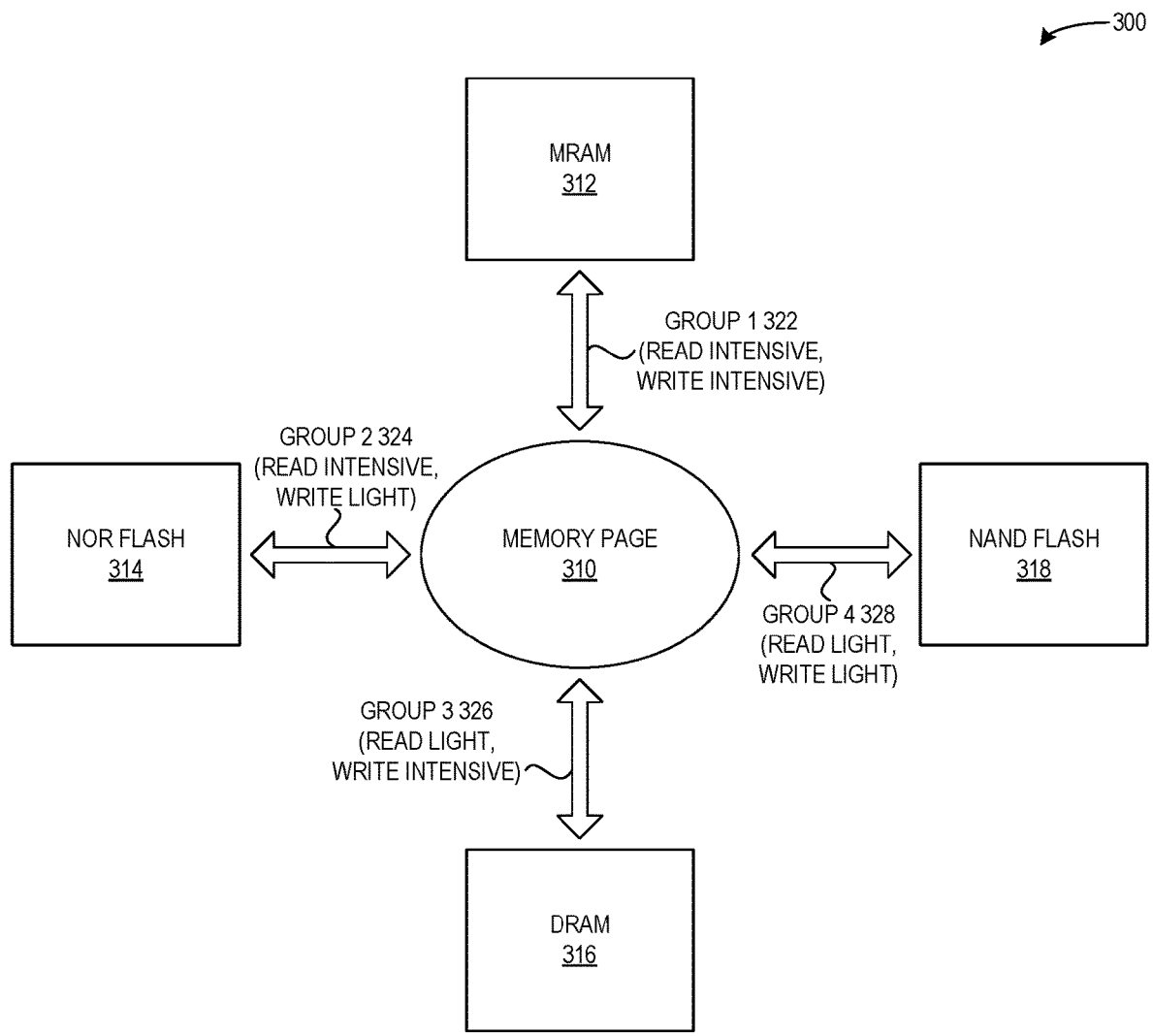
FIG. 3 illustrates an exemplary grouping of pages into multiple storage media based on a frequency of access, in accordance with an embodiment of the present application.

FIG. 3 illustrates a diagram 300 of an exemplary grouping of pages into multiple storage media based on a frequency of access, in accordance with an embodiment of the present application. Diagram 300 can include a memory page 310 and four different types of storage media, including: an MRAM 312; a NOR flash memory 314; a DRAM 316; and a NAND flash memory 318. Incoming data is initially written to MRAM 312. The data stored in main memory can be classified, grouped, or categorized based on a frequency of access of the data or an access pattern. The system can monitor the access frequency of the data in main memory, e.g., by setting or incrementing a read or write counter, by updating an access statistics table in real time, by dynamically tracking an access pattern associated with the data, etc. After a certain predetermined period of monitoring the access frequency of data, the system can move data from MRAM 312 to a correspondingly assigned other storage medium Data which is read at a frequency greater than a first predetermined threshold can be referred to as "read intensive" or "high-intensity read," and data which is read at a frequency less than the first predetermined threshold can be referred to as "read light" or "low-intensity read." Data which is read updated at a frequency greater than a second predetermined threshold can be referred to as "write intensive" or "high-intensity write," and data which is updated at a frequency less than the second predetermined threshold can be referred to as "write light" or "low-intensity write."

Diagram 300 depicts how data can be divided into one of four groups, and kept in MRAM 312 or moved to NOR flash 314, DRAM 316, or NAND flash 318 based on the associated access frequency (e.g., how frequently data is read and updated as compared to certain predetermined thresholds). Data classified or categorized as a group 1 322 (read intensive, write intensive) can be kept in MRAM 312. Exemplary data in group 1 can include pages which are associated with a database data buffer, which pages are generally read and written on a frequent basis. Data classified or categorized as a group 2 324 (read intensive, write light) can be moved or copied from MRAM 312 to NOR flash 314. Exemplary data in group 2 can include data related to the operating system and the library, which are generally accessed for read operations and infrequently updated. Data classified or categorized as a group 3 326 (read light, write intensive) can be moved or copied from MRAM 312 to DRAM 316. Data classified or categorized as a group 4 328 (read light, write light) can be moved or copied from MRAM 312 to NAND flash 318.

MRAM 312 and DRAM 316 are both generally associated with the features of low latency and high endurance, so the write intensive data is stored in MRAM 312 and DRAM 316 (e.g., as group 1 322 and group 3 326, respectively). Furthermore, because read operations in DRAM 316 are generally destructive, as each read is followed with a re-write, the system can determine to store read intensive data in MRAM 312 instead of DRAM 316, to save both power and endurance on DRAM 316. NOR flash 314 generally is associated with a short read latency but a long write latency, so the system can determine to store the read intensive and write light data in NOR flash 314. The system can also determine to store the relatively "colder pages" associated with read light and write light data in NAND flash 318. NAND flash 318 can be a flash chip in the same DIMM. Storing the "colder" and less frequently accessed data in NAND flash 318 can free up memory space in MRAM 312 which is relatively more expensive, and can also mitigate the data retention requirements of MRAM 312.

Thus, the system depicted in FIGS. 2 and 3 demonstrate breaking the trilemma of persistent memory on data retention, endurance, and performance for host memory, by classifying data in groups based on access frequency, and further by: moving group 2 data to NOR flash 314; moving group 3 data into DRAM 316; and moving group 4 "colder" data into NAND 318. This classification and movement of data to the other storage mediums can result in relaxing the burden of data retention on MRAM 312, and can thus boost the performance of MRAM 312 under its existing fabrication technology.

Exemplary Software and Hardware Stack

Figure 4:
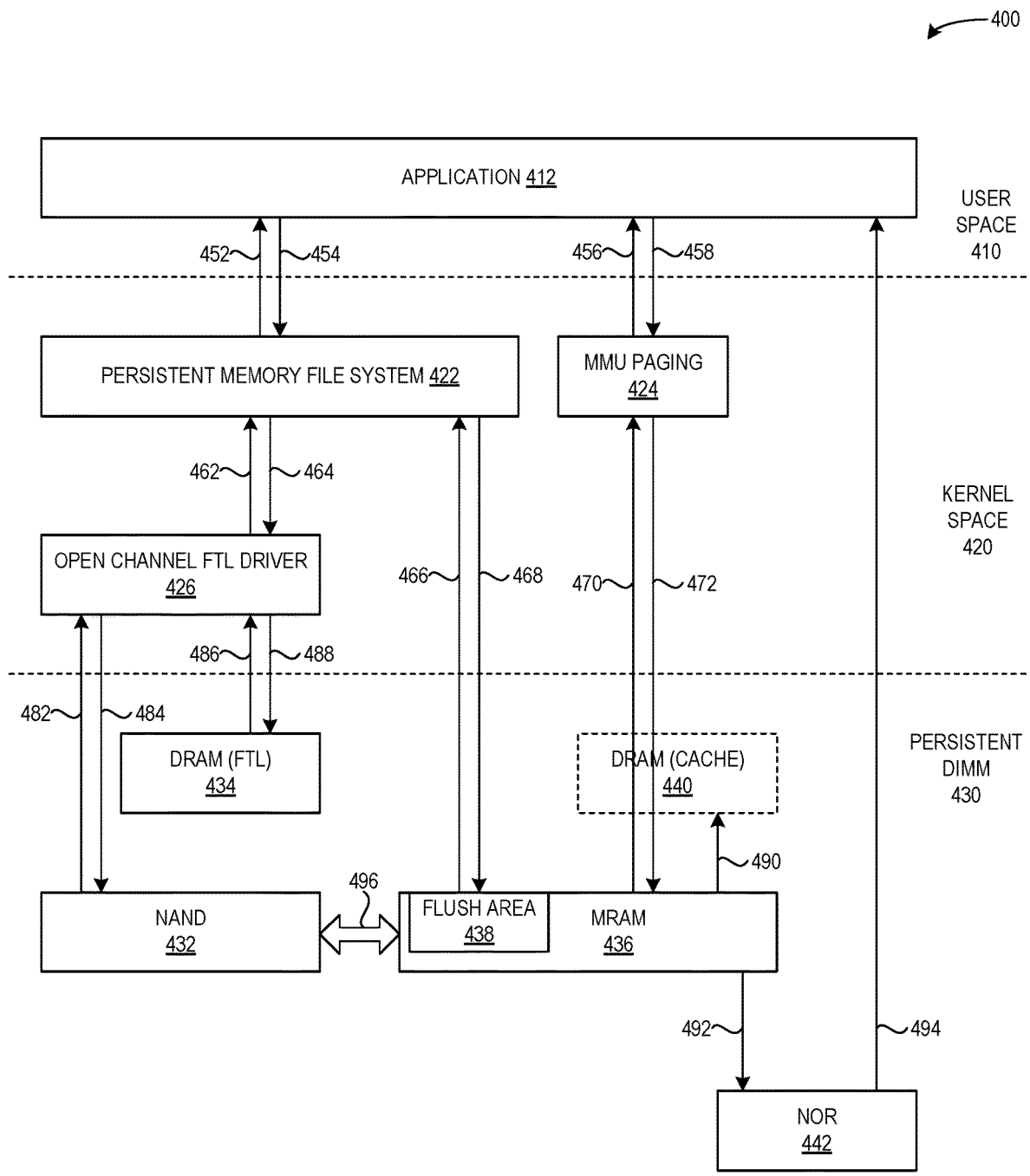
FIG. 4 illustrates an exemplary software and hardware stack, including multiple storage media, in accordance with an embodiment of the present application.

FIG. 4 illustrates a diagram 400 of an exemplary software and hardware stack, including multiple storage media, in accordance with an embodiment of the present application. Diagram 400 can include: a user space 410, which includes an application 412; a kernel space 420, which includes a persistent memory file system 422, a memory management unit (MMU) paging module 424, and an open channel FTL driver 426; and a persistent DIMM 430, which can include a NAND 432, a DRAM (FTL) 434, an MRAM 436 with a flush area 438, a DRAM (cache) 440, and a NOR 442.

During operation, an application 412 can communicate with persistent memory file system 422 (via communications 452 and 454) and with MMU paging module 424 (via communications 456 and 458). Persistent memory file system 422 can manage data stored in NAND 432 via open channel FTL drive 426, which data is moved to NAND 432 from MRAM 436, as described below. MMU paging module 424 can cause data to be written to MRAM 436 (via communications 470 and 472). That is, MRAM 436 is the main location of host memory to accommodate the input/output (I/O) from application 412 via MMU paging module 424.

The system can categorize the data in MRAM 436 based on access frequency into four groups, as described above in relation to FIG. 3. The system can move the group 2 (read intensive and write light) data from MRAM 436 to NOR 442 (via a communication 492). The DRAM is depicted in two locations as DRAM (FTL) 434 and DRAM (cache) 440 (with a dashed line), to indicate that part of DRAM (i.e., 440) may be used as the volatile write cache to hold the group 3 (read light and write intensive) data. Thus, the system can move the group 3 (read light and write intensive) data from MRAM 436 to DRAM 440 (via a communication 490).

The system can use DRAM (FTL) 434 to store a table or data structure which maps logical addresses to physical addresses, where the stored mapping information can be stored in a region or buffer of DRAM 434 for temporary low-latency access. At the same time, the system can store the persistent version of the mapping table in NAND 432. To aid in potential data recovery in the event of data loss or other accident, the NAND pages may be further organized and designed such that a respective physical block address is embedded in the header. Thus, by separating the usage capacity of DRAM into two parts, the system can use DRAM both as a volatile write cache (DRAM 440) and to store the FTL mapping information (DRAM 434).

Furthermore, the system can move the group 4 (read light, write light) data from MRAM 436 to NAND 432 via a direct connect 496. The system can subsequently re-organize the data and pages moved from MRAM 436 into NAND 432. For example, these pages can be managed by persistent memory file system 422 (via communications 462 and 464 with open channel FTL driver 426) and open channel FTL driver 426 (via communications 482 and 484).

The system can also provide low-latency storage in MRAM 436 by using flush area 438 of MRAM 436 based on its non-volatile property. Flush area 438 can provide low-latency access for data which is to be stored persistently (e.g., permanently or for a duration greater than a predetermined time period) in MRAM 436 in a file format (e.g., via communications 466 and 468). Flush area 438 can also be used to avoid or handle errors related to the memory, e.g., if a bug or other failure is detected associated with memory management or if an application causes damage to the footprint of other memory locations. Flush area 438 may not be visible as part of the overall memory space, so any memory error which occurs may not affect the data stored in flush area 438. Thus, MRAM 436 can be used in two different ways: first, as volatile memory through MMU paging module 424; and second, as non-volatile memory through persistent memory file system 422.

Exemplary Storage of ECC Parity, Reserved Pools, and Page Recycling to Facilitate Endurance Protection As the fabrication technology of persistent memory such as MRAM continues to improve, some challenges still remain with controlling the raw error rate of MRAM, e.g., with sufficient and consistent stability to reach a raw error rate level similar to that associated with DRAM. In the case of low-latency read and write operations, the system can provide a sufficient raw error rate by using a straightforward or "original" error correction code (ECC) (such as double-bit error correction code), which can generally handle routine operations required by main memory. However, because MRAM does not include the data refreshing and data scrubbing associated with DRAM, the system must rely on a "strong" ECC concatenated with the "original" ECC in order to guarantee the data reliability in MRAM.

Figures 5A, 5B:
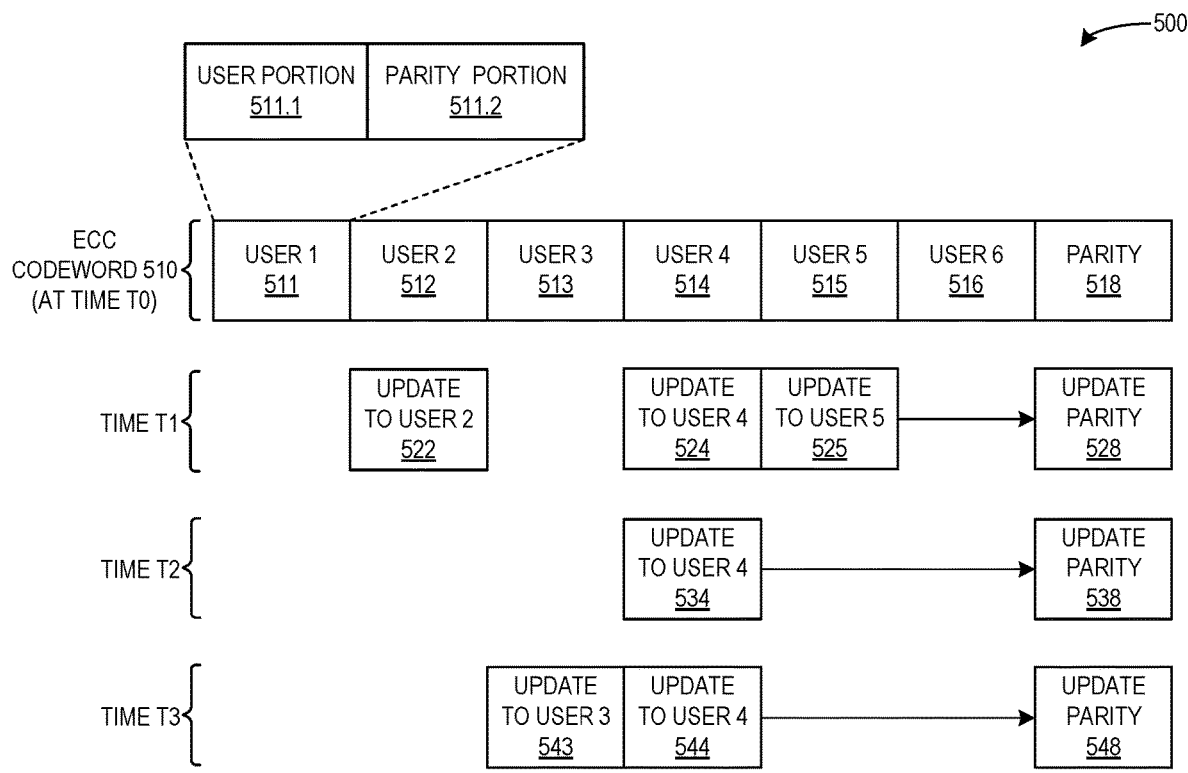
FIG. 5A illustrates an exemplary error correction code (ECC) of user data, including concatenating ECC-encoded user data chunks and generating a strong ECC parity based on the concatenated ECC-encoded user data chunks, in accordance with an embodiment of the present application.
FIG. 5B illustrates an exemplary data structure used in monitoring a frequency of access of the written user data chunks corresponding to FIG. 5A, in accordance with an embodiment of the present application.

FIG. 5A illustrates an exemplary error correction code (ECC) 500 of user data, including concatenating ECC-encoded user data chunks and generating a strong ECC parity based on the concatenated ECC-encoded user data chunks, in accordance with an embodiment of the present application. An ECC codeword 510 at a time t0 can include a plurality of concatenated user data chunks and a corresponding ECC parity data, e.g.: a user 1 511 data; a user 2 512 data; a user 3 513 data; a user 4 514 data; a user 5 515 data; a user 6 516 data; and a parity 518. Each user data portion or user data chunk can include a user portion and an ECC parity portion. For example, user 1 511 data can include a user portion 511.1 and a parity portion 511.2, which is generated based on an error correction code (ECC) encoding of user portion 511.1. Parity 511.2 may be referred to as the "original" ECC encoding. The system can concatenate the plurality of user data chunks (511-516) and generate corresponding ECC parity 518 based on a "strong" ECC.

Subsequently, at a time t1, the system can write updates to one or more of the user data chunks of ECC codeword 510, e.g.: an update to user 2 522 data; an update to user 4 524 data; and an update to user 5 525 data. These updates trigger a generation of a new parity, indicated as an update parity 528 data. At a time t2, the system can again write updates to one or more of the user data chunks of ECC codeword 510, e.g., an update to user 4 534 data, which update also triggers a generation of a new parity, indicated as an update parity 538 data. At a time t3, the system can further write updates to one or more of the user data chunks of ECC codeword 510, e.g.: an update to user 3 543 data; and an update to user 4 544 data. These updates trigger a generation of a new parity, indicated as an update parity 548 data. Because MRAM supports an in-place overwrite, FIG. 5A illustrates how only the updated user portions and the parity are overwritten. Furthermore, it can be observed that each time a user data chunk is updated (e.g., as depicted at times t1, t2, and t3), the system also generates a new parity (e.g., 528, 538, and 548). In conventional systems, this new parity simply replaces or overwrites the previous parity, e.g., at the "parity location." This can result in a "hot spot" in writing the parity location of a given ECC codeword, because the parity is generated and updated in the same location each time that the system writes an update to a user data chunk associated with the given ECC codeword. The embodiments described herein address this hot spot issue by monitoring an access frequency of a given user data chunk, specifically, a number of times that a given user data chunk is updated, as described below in relation to FIG. 5B.

FIG. 5B illustrates an exemplary data structure 550 used in monitoring a frequency of access of the written user data chunks corresponding to FIG. 5A, in accordance with an embodiment of the present application. Data structure 550 can correspond to a table which maps logical addresses to physical addresses, and which further monitors or tracks an access frequency of a given user data chunk. Data structure 550 can include entries with the following columns: a logical page address 552; a physical page address 554; a write count 556; and a read count 558. Each time that the system reads a given user data chunk, the system can increment the read count 558 of a corresponding entry in table 550. Similarly, each time that the system writes or updates a given user data chunk, the system can increment the write count 556 of the corresponding entry in table 550.

For example, table 550 can include entries 560, 562, 564, 566, 568, and 570, corresponding, respectively, to user data chunks 1-6 (511-516) of FIG. 5A. After each set of updates is written at each of times t1, t2, and t3, the system can correspondingly update write count 556 of the given entry. Thus, after time t3, table 550 can include, e.g.: entry 562 corresponding to user data chunk 2 512, with a write count value of k=k+1, where k can be 0 or another value for write count 556 of entry 562 at a time t0; entry 564 corresponding to user data chunk 3 513, with a write count value of m=m+1, where k can be 0 or another value for write count 556 of entry 564 at a time t0; entry 566 corresponding to user data chunk 4 514, with a write count value of n=n+3, where n can be 0 or another value for write count 556 of entry 566 at a time t0; and entry 568 corresponding to user data chunk 5 515, with a write count value of p=p+1, where p can be 0 or another value for write count 556 of entry 568 at a time t0.

Assume that the initial ECC parity 518 of ECC codeword 510 is stored at a first physical location in the MRAM. Prior to writing a corresponding update parity data (e.g., a generated new parity such as 528, 538, and 548) to the same first physical location in the MRAM, the system can determine whether write count 556 in table 550 for a given user data chunk in a corresponding entry is less than a predetermined number. If write count 556 is less than the predetermined number, the system can write the generated new parity to the same first physical location as the initial ECC parity (e.g., by overwriting the first physical location). If write count 556 is not less than the predetermined number, the system can write the generated new parity to a second physical location of the MRAM, where the second physical location is a location in the MRAM different from the first physical location. In some embodiments, the system can allocate the second physical location from a reserved pool for parity endurance wearing, as described below in relation to FIGS. 6A and 6B.

Thus, by monitoring the access frequency of data, and specifically, by tracking the number of times that a user data portion is updated (e.g., incrementing and tracking the write count in table 550) and comparing the write count to a predetermined number, the system can write the generated ECC parity to a different location if the write count is greater than the predetermined number. This can result in improving the endurance of the MRAM, which can further result in an improvement in the efficiency and performance of the overall storage system.

Moreover, in order to avoid a situation in which a particular physical location in MRAM results in a fault due to frequent write updates, the embodiments described herein can provide extra physical space in order to accommodate incoming write operations and distribute the write burden across the entire physical medium. Because the parity portion generally experiences a greater number of write operations than the user data portion, the system can provide a second reserved pool of pages in the MRAM associated with usage by parity data which is greater than a first reserved pool of pages in the MRAM associated with usage by user data. Alternatively, a first ratio of a nominal capacity for user data to a nominal capacity for parity data (e.g., 4:1) can be greater than a second ratio of a size of the first reserved pool to a size of the second reserved pool (e.g., 1:4).

Figure 6A:
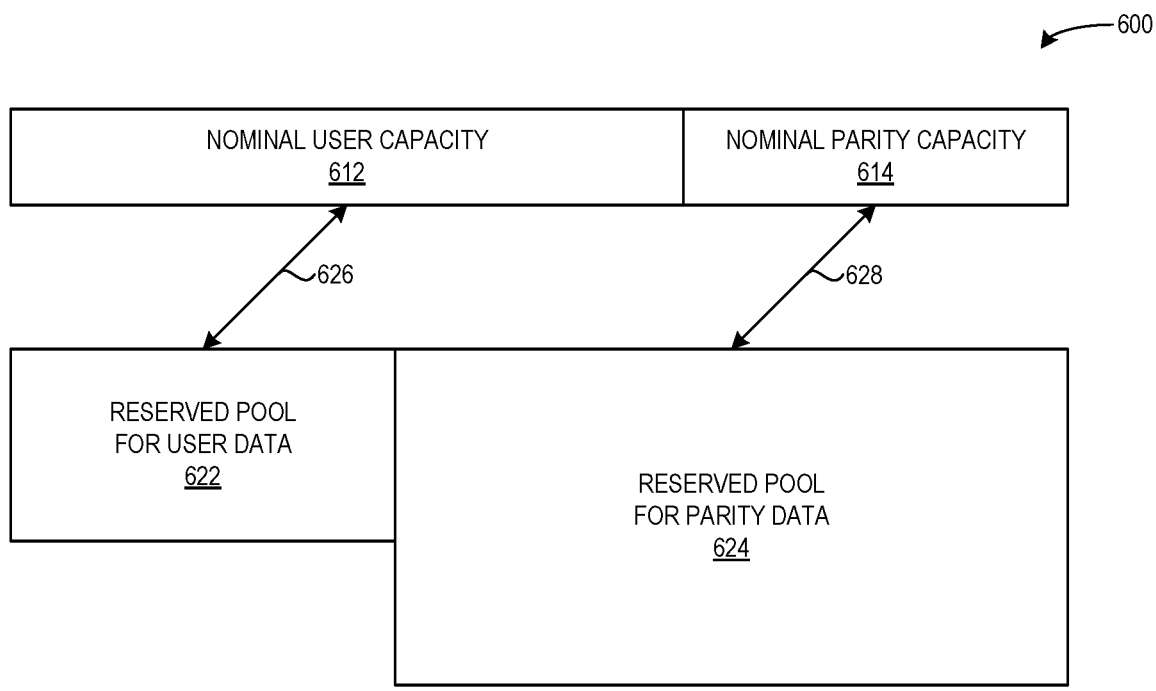
FIG. 6A depicts a diagram with an exemplary allocation of physical space between user data and parity data, in accordance with an embodiment of the present application.

FIG. 6A depicts a diagram 600 with an exemplary allocation of physical space between user data and parity data, in accordance with an embodiment of the present application. Diagram 600 can include a nominal user capacity 612 and a nominal parity capacity 614, which can be respectively assigned to or associated with a reserved pool for user data 622 and a reserved pool for parity data 624. Note that a first ratio of nominal user capacity 612 to nominal parity capacity 614 can be greater than a second ratio of a size of reserved pool for user data 622 to a size of reserved pool for parity data 624.

Figure 6B:
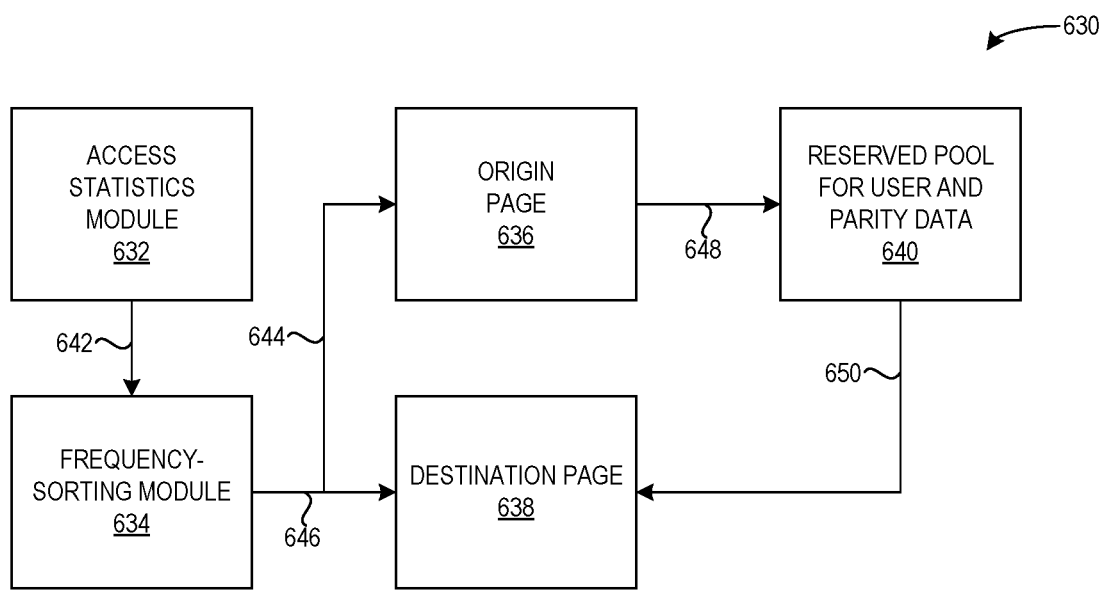
FIG. 6B depicts an exemplary process for online replacement of pages based on access frequency and allocation from a reserved pool of pages, in accordance with an embodiment of the present application.

FIG. 6B depicts an exemplary process 630 for online replacement of pages based on access frequency and allocation from a reserved pool of pages, in accordance with an embodiment of the present application. During operation, an access statistics module 632 can monitor a frequency of access of the data, e.g., by monitoring a write count or a read count, as described above in relation to FIGS. 3, 4, 5A, and 5B. Access statistics module 632 can monitor the access frequency in a dynamic manner (e.g., on the fly for each read or write operation). The system can send the statistics, data, and related information (via a communication 642) to a frequency-sorting module 634. Frequency-sorting module 634 can dynamically order or list the pages in a descending order of write count (or read count). Frequency-sorting module 634 can also order or list the pages on a periodic basis or based on a predetermined time interval. Frequency-sorting module 634 can determine the pages with the most number of writes (i.e., the highest write count) and identify those pages as an origin page 636 (via a communication 644). Because frequency-sorting module 634 operates by ordering or listing pages based on a cumulative and current number of write operations performed on a respective page, the embodiments described herein can evenly distribute the usage of pages as origin pages and destination pages. That is, the system can put origin pages which are associated with a certain write count into the reserved pool, and allocate destination pages from the reserved pool based on not only the write count of a respective destination page, but the write count as compared to the write counts of all other pages in the reserved pool. In some embodiments, the system may use a maximum write count number as a basis for retiring a page or placing the page in a different pool for emergency usage only, i.e., if no other pages with an associated write count of less than the maximum write count number exist in the reserved pool.

For each origin page, the system can allocate a destination page from a reserved pool for user and parity data 640 (via a communication 650). For example, frequency-sorting module 634 can determine that an origin page 636 is associated with a number of write counts greater than a predetermined number. On a subsequent write or an incoming update, the system can allocate from a reserved pool for user and parity data 640 a corresponding destination page 638 for origin page 636, write the updated data to destination page 638 (via a communication 646), and mark origin page 636 as available, e.g., by marking or placing origin page 636 back into reserved pool 640 for future use as a destination page (via a communication 648). The origin page 636 can maintain its actual write count, and may stay in or be associated with reserved pool 640 until the system selects origin page 636 as the destination page.

Thus, the system can use the write count to determine the pages to which updates of parity data (or, in some embodiments, user data) may be written. The system can also determine the conditions which trigger replacing an origin page with a destination page (e.g., writing an update of parity to a destination page instead of an origin page). Moreover, the system can determine the conditions which trigger allocating a particular page from the reserved pool for use as a destination page to replace an origin page (e.g., based on the maintained write count for a potential destination page associated with the reserved pool).

Method for Facilitating Operation of a Storage System

Figure 7A:
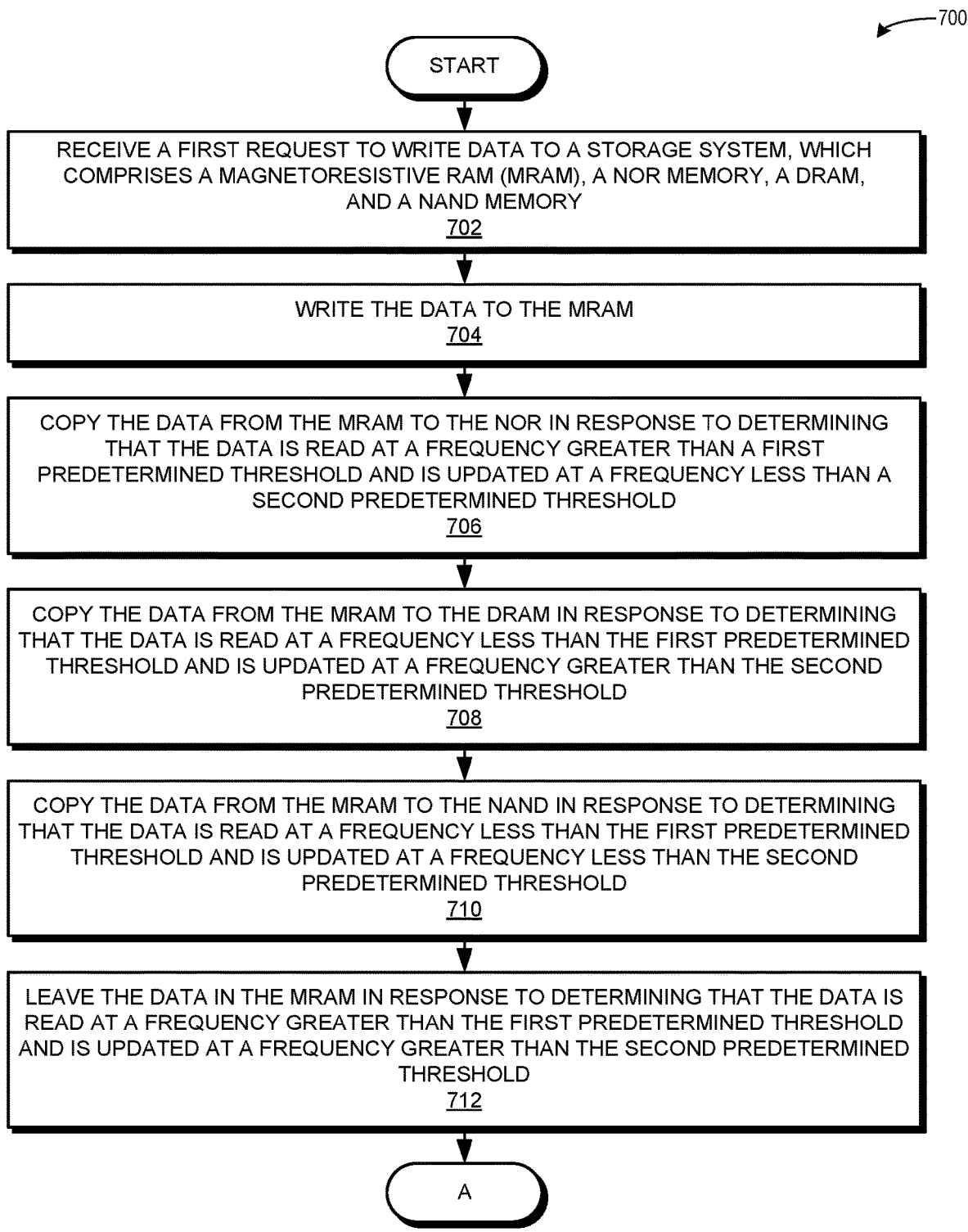
FIG. 7A presents a flowchart illustrating a method for facilitating operation of a storage system, including copying data to various storage media based on access frequency, in accordance with an embodiment of the present application.

FIG. 7A presents a flowchart 700 illustrating a method for facilitating operation of a storage system, including copying data to various storage media based on access frequency, in accordance with an embodiment of the present application. During operation, the system receives a first request to write data to a storage system, which comprises a magnetoresistive random-access memory (MRAM), a Not-OR (NOR) memory, a dynamic random access memory (DRAM), and a Not-AND (NAND) memory (operation 702). The system writes the data to the MRAM (operation 704). The system copies the data from the MRAM to the NOR in response to determining that the data is read at a frequency greater than a first predetermined threshold and is updated at a frequency less than a second predetermined threshold (operation 706). The system copies the data from the MRAM to the DRAM in response to determining that the data is read at a frequency less than the first predetermined threshold and is updated at a frequency greater than the second predetermined threshold (operation 708). The system copies the data from the MRAM to the NAND in response to determining that the data is read at a frequency less than the first predetermined threshold and is updated at a frequency less than the second predetermined threshold (operation 710). The system leaves the data in the MRAM in response to determining that the data is read at a frequency greater than the first predetermined threshold and is updated at a frequency greater than the second predetermined threshold (operation 712), and the operation continues at Label A of FIG. 7B.

Figure 7B:
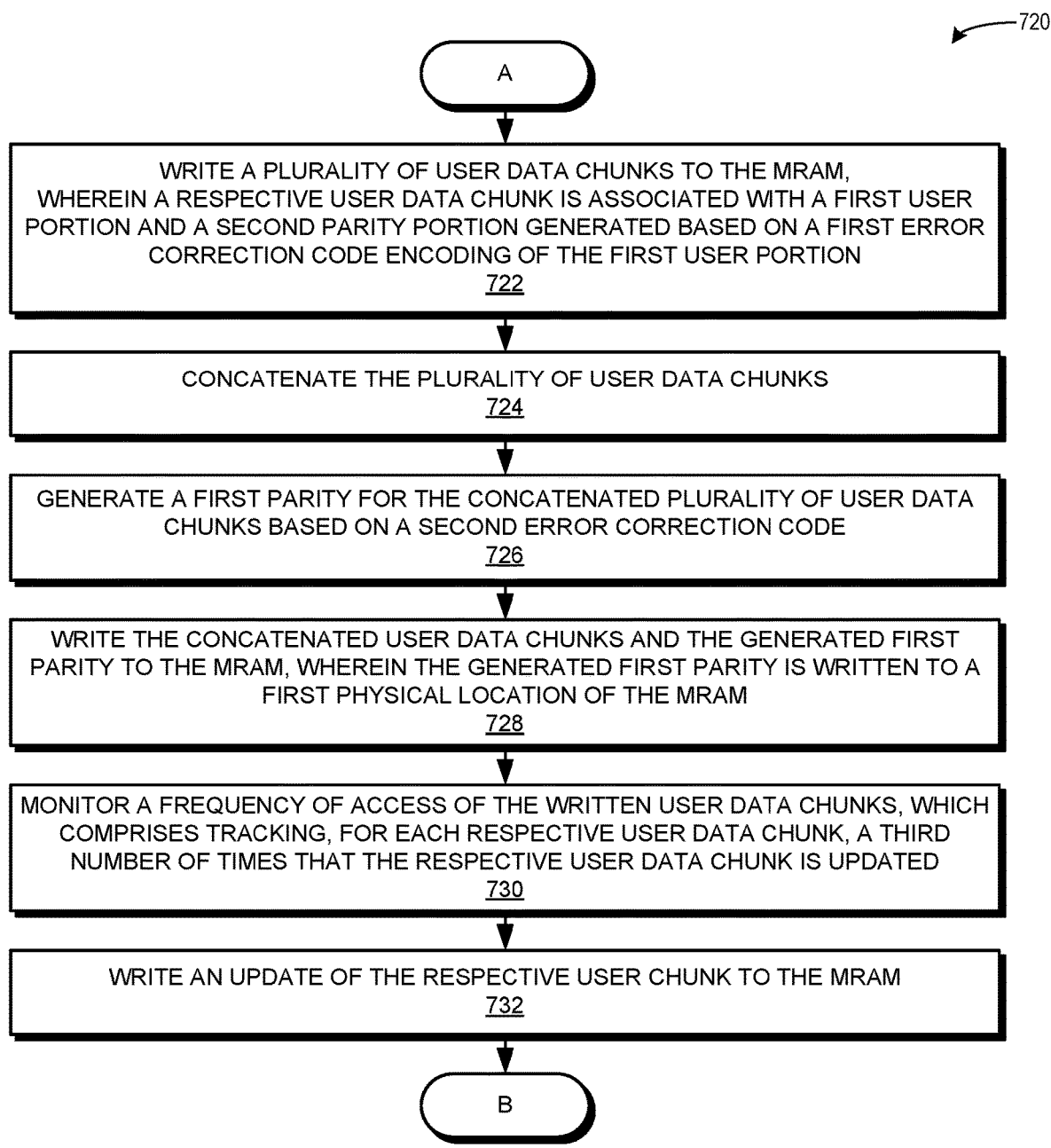
FIG. 7B presents a flowchart illustrating a method for facilitating operation of a storage system, including generating the ECC parity and writing the generated ECC parity to a location based on a number of times that data is updated, in accordance with an embodiment of the present application.

FIG. 7B presents a flowchart 720 illustrating a method for facilitating operation of a storage system, including generating the ECC parity and writing the generated ECC parity to a location based on a number of times that data is updated, in accordance with an embodiment of the present application. During operation, the system writes a plurality of user data chunks to the MRAM, wherein a respective user data chunk is associated with a first user portion and a second parity portion generated based on a first error correction code (ECC) encoding of the first user portion (operation 722). The system concatenates the plurality of user data chunks (operation 724). The system generates a first parity for the concatenated plurality of user data chunks based on a second error correction code (ECC) (operation 726). The second ECC can be stronger ECC than the first ECC, to account for the generally higher raw error bit rate of MRAM as compared to DRAM, as described above in relation to FIGS. 5A and 5B.

The system writes the concatenated user data chunks and the generated first parity to the MRAM, wherein the generated first parity is written to a first physical location of the MRAM (operation 728). The system monitors a frequency of access of the written user data chunks, which comprises tracking, for each respective user data chunk, a third number of times that the respective user data chunk is updated (operation 730). The system writes an update of the respective user chunk to the MRAM (operation 732), and the operation continues at Label B of FIG. 7C.

Figure 7C:
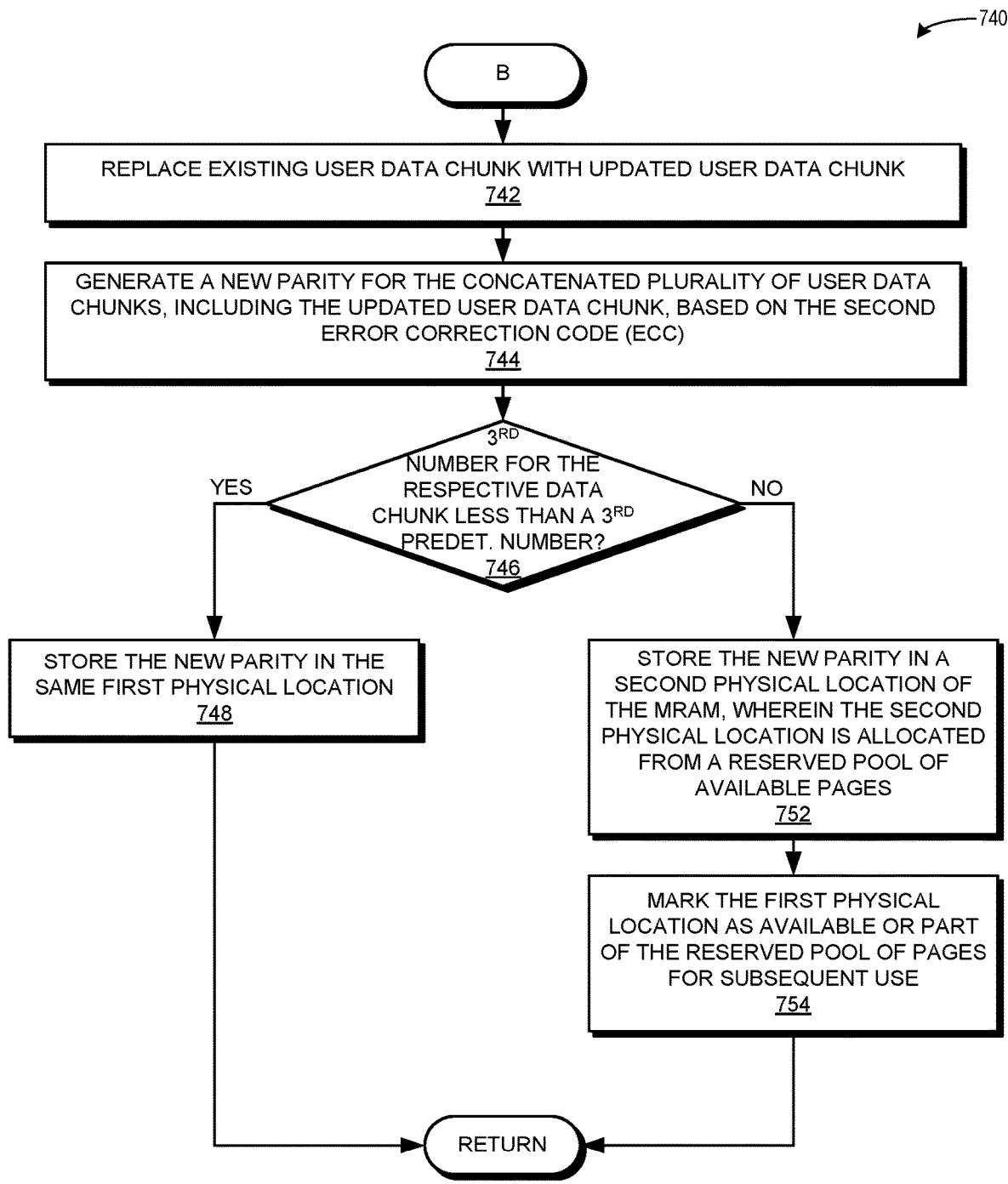
FIG. 7C presents a flowchart illustrating a method for facilitating operation of a storage system, including writing the generated ECC parity to a location based on a number of times that data is updated, in accordance with an embodiment of the present application.

FIG. 7C presents a flowchart 740 illustrating a method for facilitating operation of a storage system, including writing the generated ECC parity to a location based on a number of times that data is updated, in accordance with an embodiment of the present application. During operation, the system replaces an existing user data chunk with the updated user data chunk (operation 742). The system generates a new parity for the concatenated plurality of user data chunks, including the updated user data chunk, based on the second error correction code (ECC) (operation 744). If the third number for the respective user data chunk is less than a third predetermined number (decision 746), the system stores the new parity in the same first physical location (operation 748). If the third number for the respective user data chunk is not less than (i.e., is greater than) the third predetermined number (decision 746), the system stores the new parity in a second physical location of the MRAM (operation 752) and the system marks the first physical location as available or part of a reserved pool of pages for subsequent use (operation 754). The second physical location may be associated with or in a page allocated from a reserved pool of pages, as described above in relation to FIGS. 6A and 6B. The system can also place or return a page corresponding to the first physical location in/to the reserved pool of pages for subsequent use or allocation, e.g., by evenly distributing data based on the corresponding write count for each page.

Exemplary Computer System and Apparatus

Figure 8:
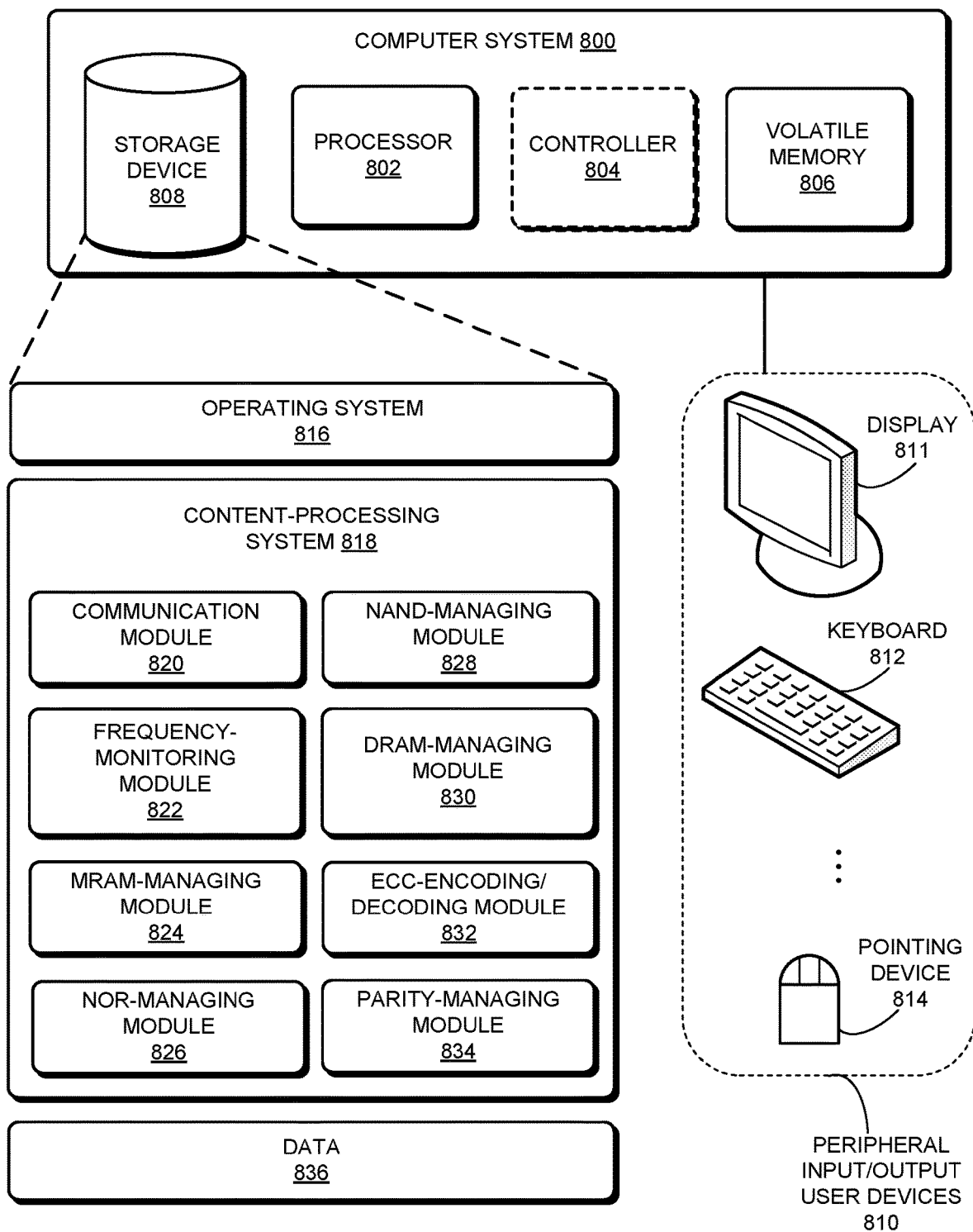
FIG. 8 illustrates an exemplary computer system that facilitates operation of a storage system, in accordance with an embodiment of the present application.

FIG. 8 illustrates an exemplary computer system 800 that facilitates operation of a storage system, in accordance with an embodiment of the present application. Computer system 800 includes a processor 802, a volatile memory 806, and a storage device 808. In some embodiments, computer system 800 can include a controller 804 (indicated by the dashed lines). Volatile memory 806 can include, e.g., random access memory (RAM), that serves as a managed memory, and can be used to store one or more memory pools. Storage device 808 can include persistent storage which can be managed or accessed via processor 802 (or controller 804). Furthermore, computer system 800 can be coupled to peripheral input/output (I/O) user devices 810, e.g., a display device 811, a keyboard 812, and a pointing device 814. Storage device 808 can store an operating system 816, a content-processing system 818, and data 836.

Content-processing system 818 can include instructions, which when executed by computer system 800, can cause computer system 800 or processor 802 to perform methods and/or processes described in this disclosure. Specifically, content-processing system 818 can include instructions for receiving and transmitting data packets, including data to be read or written and an input/output (I/O) request (e.g., a read request or a write request) (communication module 820).

Content-processing system 818 can further include instructions for receiving a first request to write data to a storage system, which comprises a magnetoresistive random-access memory (MRAM), a Not-OR (NOR) memory, a dynamic random access memory (DRAM), and a Not-AND (NAND) memory (communication module 820). Content-processing system 818 can include instructions for writing the data to the MRAM (MRAM-managing module 824). Content-processing system 818 can include instructions for copying the data from the MRAM to the NOR (NOR-managing module 826) in response to determining that the data is read at a frequency greater than a first predetermined threshold and is updated at a frequency less than a second predetermined threshold (frequency-monitoring module 822). Content-processing system 818 can also include instructions for copying the data from the MRAM to the DRAM (DRAM-managing module 830) in response to determining that the data is read at a frequency less than the first predetermined threshold and is updated at a frequency greater than the second predetermined threshold (frequency-monitoring module 822). Content-processing system 818 can include instructions for copying the data from the MRAM to the NAND (NAND-managing module 828) in response to determining that the data is read at a frequency less than the first predetermined threshold and is updated at a frequency less than the second predetermined threshold (frequency-monitoring module 822). Content-processing system 818 can include instructions for leaving the data in the MRAM (MRAM-managing module 824) in response to determining that the data is read at a frequency greater than the first predetermined threshold and is updated at a frequency greater than the second predetermined threshold (frequency-monitoring module 822).

Content-processing system 818 can additionally include instructions for performing the operations described above in FIGS. 5A, 5B, 6A, and 6B, e.g., encoding and decoding data based on an ECC (ECC-encoding/decoding module 832) and generating and storing a new ECC parity in a same or a different physical location as a previous ECC parity based on a monitored frequency access of the data (e.g., a write count) (parity-managing module 834).

Data 836 can include any data that is required as input or generated as output by the methods and/or processes described in this disclosure. Specifically, data 836 can store at least: data; a request; a read request; a write request; an input/output (I/O) request; data or metadata associated with a read request, a write request, or an I/O request; an indicator or identifier of an MRAM, NOR, DRAM, or NAND; a logical address or a logical page address; a physical address or a physical page address in an MRAM, NOR, DRAM, or NAND; a first or a second predetermined threshold; a frequency at which data is read or is updated; a read count; a write count; an access frequency; a monitored access frequency of data; a table or data structure; an entry in a table or data structure; an entry for a user data portion, where the entry maps a logical address to a physical address, a write count, and a read count; a size; a first reserved pool; a second reserved pool; a first ratio of a nominal capacity for user data to a nominal capacity for parity data; a second ratio of a size of the first reserved pool to a size of the second reserved pool; a user data chunk or a user data portion; a user portion and a parity portion of a user data chunk; a first error correction code (ECC); a second error correction code (ECC); concatenated user data chunks which include a user portion and a parity portion based on the first ECC; an ECC parity of the concatenated user data chunks based on the second ECC; a third predetermined number; and an indicator of whether to store a newly generated parity or any data portion in a same or a different location as the corresponding previous parity or data portion based on a monitored access frequency or write count of a given user data portion.

Figure 9:
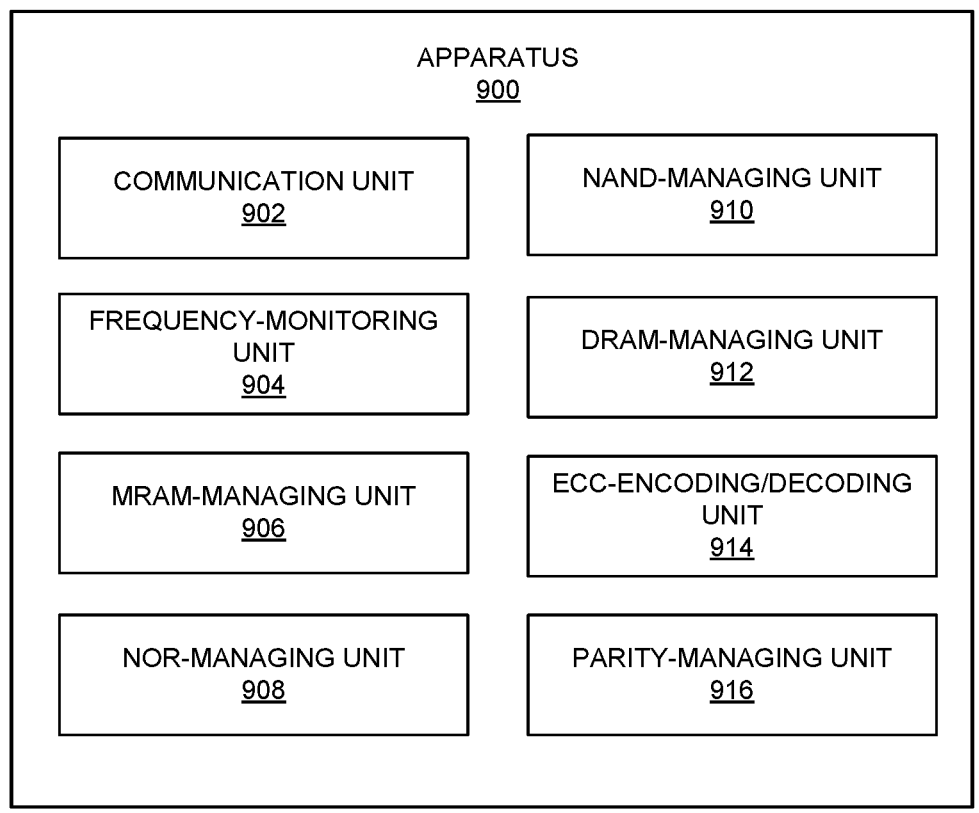
FIG. 9 illustrates an exemplary apparatus that facilitates operation of a storage system, in accordance with an embodiment of the present application.

FIG. 9 illustrates an exemplary apparatus that facilitates operation of a storage system, in accordance with an embodiment of the present application. Apparatus 900 can comprise a plurality of units or apparatuses which may communicate with one another via a wired, wireless, quantum light, or electrical communication channel. Apparatus 900 may be realized using one or more integrated circuits, and may include fewer or more units or apparatuses than those shown in FIG. 9. Furthermore, apparatus 900 may be integrated in a computer system, or realized as a separate device or devices capable of communicating with other computer systems and/or devices. Apparatus 900 can include at least one MRAM memory component, one NOR flash memory component, one DRAM component, and one NAND flash memory component.

Apparatus 900 may also include a storage system which includes MRAM, NOR, DRAM, and NAND. Apparatus 900 can comprise modules or units 902-916 which are configured to perform functions or operations similar to modules 820-834 of computer system 800 of FIG. 8, including: a communication unit 902; a frequency-monitoring unit 904; an MRAM-managing unit 906; a NOR-managing unit 908; a NAND-managing unit 910; a DRAM-managing unit 912; an ECC-encoding/decoding unit 914; and a parity-managing unit 916.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method, comprising:
receiving a first request to write data to a storage system, which comprises a first non-volatile memory, a second non-volatile memory, a dynamic random access memory (DRAM), and a third non-volatile memory;
writing the data to the first non-volatile memory;
monitoring a frequency of access of the data, which comprises:
determining whether the data is read at a frequency greater than or less than a first predetermined threshold; and determining whether the data is updated at a frequency greater than or less than a second predetermined threshold;

responsive to determining that the data is read at a frequency greater than the first predetermined threshold and responsive to determining that the data is updated at a frequency less than the second predetermined threshold, copying the data from the first non-volatile memory to the second non-volatile memory;

responsive to determining that the data is read at a frequency less than the first predetermined threshold and responsive to determining that the data is updated at a frequency greater than the second predetermined threshold, copying the data from the first non-volatile memory to the DRAM; and responsive to determining that the data is read at a frequency less than the first predetermined threshold and responsive to determining that the data is updated at a frequency less than the second predetermined threshold, copying the data from the first non-volatile memory to the third non-volatile memory.

2. The method of claim 1, further comprising:
leaving the data in the first non-volatile memory in response to determining that the data is read at a frequency greater than the first predetermined threshold and is updated at a frequency greater than the second predetermined threshold.

3. The method of claim 1, further comprising:
tracking, in a first table, a first number of times that the data is read; and
tracking, in the first table, a second number of times that the data is updated.

4. The method of claim 1,
wherein a first reserved pool of pages in the first non-volatile memory is associated with usage by user data,
wherein a second reserved pool of pages in the first non-volatile memory is associated with usage by parity data,
wherein the second reserved pool is bigger than the first reserved pool, and
wherein a first ratio of a nominal capacity for user data to a nominal capacity for parity data is greater than a second ratio of a size of the first reserved pool to a size of the second reserved pool.

5. The method of claim 1,
wherein the first non-volatile memory comprises a magnetoresistive random-access memory (MRAM),
wherein the second non-volatile memory comprises a Not-OR (NOR) memory, and
wherein the third non-volatile memory comprises a Not-AND (NAND) memory.

6. The method of claim 1, further comprising:
writing a plurality of user data chunks to the first non-volatile memory,
wherein a respective user data chunk is associated with a first user portion and a second parity portion generated based on a first error correction code (ECC) encoding of the first user portion, and
wherein writing the plurality of user data chunks to the first non-volatile memory involves:
concatenating the plurality of user data chunks;
generating a first parity for the concatenated plurality of user data chunks based on a second error correction code (ECC); and
writing the concatenated user data chunks and the generated first parity to the first non-volatile memory, wherein the generated first parity is written to a first physical location of the first non-volatile memory; and
monitoring a frequency of access of the written user data chunks, which comprises tracking, for each respective user data chunk, a third number of times that the respective user data chunk is updated.

7. The method of claim 6, wherein the method further comprises writing an update of the respective user data chunk to the first non-volatile memory, which involves:
replacing an existing user data chunk with the updated user data chunk;
generating a new parity for the concatenated plurality of user data chunks, including the updated user data chunk, based on the second error correction code (ECC); and
in response to determining that the third number for the respective user data chunk is less than a third predetermined number, storing the new parity in the same first physical location.

8. The method of claim 7, wherein the method further comprises:
in response to determining that the third number for the respective user data chunk is greater than the third predetermined number:
storing the new parity in a second physical location of the first non-volatile memory; and
marking the first physical location as available or part of a reserved pool of pages for subsequent use.

9. A computer system, comprising:
a processor; and
a memory coupled to the processor and storing instructions which, when executed by the processor, cause the processor to perform a method, the method comprising:
receiving a first request to write data to a storage system, which comprises a first non-volatile memory, a second non-volatile memory, a dynamic random access memory (DRAM), and a third non-volatile memory;
writing the data to the first non-volatile memory;
monitoring a frequency of access of the data, which comprises:
determining whether the data is read at a frequency greater than or less than a first predetermined threshold; and
determining whether the data is updated at a frequency greater than or less than a second predetermined threshold;
responsive to determining that the data is read at a frequency greater than a first predetermined threshold and responsive to determining that the data is updated at a frequency less than a second predetermined threshold, copying the data from the first non-volatile memory to the second non-volatile memory;
responsive to determining that the data is read at a frequency less than the first predetermined threshold and responsive to determining that the data is updated at a frequency greater than the second predetermined threshold, copying the data from the first non-volatile memory to the DRAM; and
responsive to determining that the data is read at a frequency less than the first predetermined threshold and responsive to determining that the data is updated at a frequency less than the second predetermined threshold, copying the data from the first non-volatile memory to the third non-volatile memory.

10. The computer system of claim 9, wherein the method further comprises:
leaving the data in the first non-volatile memory in response to determining that the data is read at a frequency greater than the first predetermined threshold and is updated at a frequency greater than the second predetermined threshold.

11. The computer system of claim 9, wherein the method further comprises:
tracking, in a first table, a first number of times that the data is read; and
tracking, in the first table, a second number of times that the data is updated.

12. The computer system of claim 9,
wherein a first reserved pool of pages in the first non-volatile memory is associated with usage by user data,
wherein a second reserved pool of pages in the first non-volatile memory is associated with usage by parity data,
wherein the second reserved pool is bigger than the first reserved pool, and
wherein a first ratio of a nominal capacity for user data to a nominal capacity for parity data is greater than a second ratio of a size of the first reserved pool to a size of the second reserved pool.

13. The computer system of claim 9,
wherein the first non-volatile memory comprises a magnetoresistive random-access memory (MRAM),
wherein the second non-volatile memory comprises a Not-OR (NOR) memory, and
wherein the third non-volatile memory comprises a Not-AND (NAND) memory.

14. The computer system of claim 9, wherein the method further comprises:
writing a plurality of user data chunks to the first non-volatile memory,
wherein a respective user data chunk is associated with a first user portion and a second parity portion generated based on a first error correction code (ECC) encoding of the first user portion, and
wherein writing the plurality of user data chunks to the first non-volatile memory involves:
concatenating the plurality of user data chunks;
generating a first parity for the concatenated plurality of user data chunks based on a second error correction code (ECC); and
writing the concatenated user data chunks and the generated first parity to the first non-volatile memory,
wherein the generated first parity is written to a first physical location of the first non-volatile memory; and
monitoring a frequency of access of the written user data chunks, which comprises tracking, for each respective user data chunk, a third number of times that the respective user data chunk is updated.

15. The computer system of claim 14, wherein the method further comprises writing an update of the respective user data chunk to the first non-volatile memory, which involves:
replacing an existing user data chunk with the updated user data chunk;
generating a new parity for the concatenated plurality of user data chunks, including the updated user data chunk, based on the second error correction code (ECC); and
in response to determining that the third number for the respective user data chunk is less than a third predetermined number, storing the new parity in the same first physical location.

16. The computer system of claim 15, wherein the method further comprises:
in response to determining that the third number for the respective user data chunk is greater than the third predetermined number:
storing the new parity in a second physical location of the first non-volatile memory; and
marking the first physical location as available or part of a reserved pool of pages for subsequent use.

17. An apparatus, comprising:
a storage system, which comprises a first non-volatile memory, a second non-volatile memory, a dynamic random access memory (DRAM), and a third non-volatile memory;
a physical media-managing unit configured to write the data to the first non-volatile memory;
a frequency-monitoring unit configured to monitor a frequency of access of the data, which comprises:
determining whether the data is read at a frequency greater than or less than a first predetermined threshold; and
determining whether the data is updated at a frequency greater than or less than a second predetermined threshold;
wherein the physical media-managing unit is further configured to, responsive to the frequency-monitoring unit determining that the data is read at a frequency greater than a first predetermined threshold and determining that the data is updated at a frequency less than a second predetermined threshold copy the data from the first non-volatile memory to the second non-volatile memory;
wherein the physical media-managing unit is further configured to, responsive to the frequency-monitoring unit determining that the data is read at a frequency less than the first predetermined threshold and determining that the data is updated at a frequency greater than the second predetermined threshold, copy the data from the first non-volatile memory to the DRAM; and
wherein the physical media-managing unit is further configured to, responsive to the frequency-monitoring unit determining that the data is read at a frequency less than the first predetermined threshold and determining that the data is updated at a frequency less than the second predetermined threshold, copy the data from the first non-volatile memory to the third non-volatile memory.

18. The apparatus of claim 17,
wherein the physical media-managing unit is further configured to:
write a plurality of user data chunks to the first non-volatile memory, wherein a respective user data chunk is associated with a first user portion and a second parity portion generated based on a first error correction code (ECC) encoding of the first user portion; and
concatenate the plurality of user data chunks;

and wherein the apparatus further comprises:

an ECC-encoding/decoding unit configured to generate a first parity for the concatenated plurality of user data chunks based on a second error correction code (ECC);

wherein the physical media-managing unit is further configured to write the concatenated user data chunks and the generated first parity to the first non-volatile memory, wherein the generated first parity is written to a first physical location of the first non-volatile memory;

wherein the frequency-monitoring unit is further configured to monitor a frequency of access of the written user data chunks, which comprises tracking, for each respective user data chunk, a third number of times that the respective user data chunk is updated;

wherein the physical media-managing unit is further configured to write an update of the respective user data chunk to the first non-volatile memory, which involves:
the physical media-managing unit replacing an existing user data chunk with the updated user data chunk;
the ECC-encoding/decoding unit generating a new parity for the concatenated plurality of user data chunks, including the update user data chunk, based on the second error correction code (ECC); and wherein in response to the frequency-monitoring unit determining that the third number for the respective user data chunk is less than a third predetermined number, the physical media-managing unit is further configured to store the new parity in the same first physical location; and wherein in response to the frequency-monitoring unit determining that the third number for the respective user data chunk is greater than the third predetermined number, the physical media-managing unit is further configured to:
store the new parity in a second physical location of the first non-volatile memory; and
mark the first physical location as available or part of a reserved pool of pages for subsequent use.

* * * * *